United States Patent
Pozzari et al.

(10) Patent No.: US 9,101,246 B2
(45) Date of Patent: Aug. 11, 2015

(54) AUTOMATIC COFFEE MAKER WITH SENSOR FOR DETECTING THE QUANTITY OF COFFEE IN THE MACHINE

(75) Inventors: Stefano Pozzari, Como (IT); Ciro Adelmo Pilone, Calderara de Reno (IT)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 214 days.

(21) Appl. No.: 13/147,394

(22) PCT Filed: Feb. 5, 2010

(86) PCT No.: PCT/IB2010/050534
§ 371 (c)(1),
(2), (4) Date: Aug. 2, 2011

(87) PCT Pub. No.: WO2010/089715
PCT Pub. Date: Aug. 12, 2010

(65) Prior Publication Data
US 2011/0283888 A1    Nov. 24, 2011

(30) Foreign Application Priority Data
Feb. 9, 2009   (IT) .............................. FI2009A0027

(51) Int. Cl.
*A47J 31/06*   (2006.01)
*A47J 31/42*   (2006.01)

(52) U.S. Cl.
CPC ..................................... *A47J 31/42* (2013.01)

(58) Field of Classification Search
CPC ........... A47J 31/42; A47J 31/52; A47J 31/56; G01F 23/26; G01F 23/263; G01F 23/266; G05D 11/132

USPC .............. 99/280, 285, 286, 289 R; 73/304 C; 221/96; 222/23; 700/233, 239
See application file for complete search history.

(56) References Cited

U.S. PATENT DOCUMENTS

| 4,204,427 | A | * | 5/1980 | Gothe et al. ................. 73/304 C |
| 5,207,148 | A | * | 5/1993 | Anderson et al. ............... 99/281 |
| 6,550,648 | B2 | | 4/2003 | Bardin |
| 7,182,017 | B1 | * | 2/2007 | Knepler et al. ................. 99/279 |
| 2005/0087013 | A1 | * | 4/2005 | Lin ............... 73/304 C |
| 2006/0222736 | A1 | * | 10/2006 | Keller .............................. 426/45 |
| 2010/0068362 | A1 | * | 3/2010 | De'Longhi ................... 426/432 |

FOREIGN PATENT DOCUMENTS

| EP | 1440641 A1 | 7/2004 |
| EP | 1903519 A2 | 3/2008 |
| JP | 622856 A | 2/1994 |
| JP | H6-22856 | * 2/1994 |
| JP | 2002136428 A | 5/2002 |
| WO | 2007000195 A1 | 1/2007 |
| WO | WO 2007000195 A1 * 1/2007 ............. A47J 31/52 |
| WO | 2008001403 A1 | 1/2008 |
| WO | WO 2008154698 A1 * 12/2008 |

* cited by examiner

*Primary Examiner* — Dana Ross
*Assistant Examiner* — Brandon Harvey

(57) ABSTRACT

The machine comprises: a brewing unit (3); a water reservoir (7); a boiler (11) for the production of hot water to supply to the brewing unit; a coffee container (13); an electronic control unit (27); a user interface (33). At least one capacitive sensor (31) is associated to the coffee container to detect the quantity of residual coffee in the container (13). The sensor is connected to the electronic control unit, which is programmed to supply to a user by means of the interface at least a piece of information regarding the quantity of coffee in said container.

10 Claims, 2 Drawing Sheets

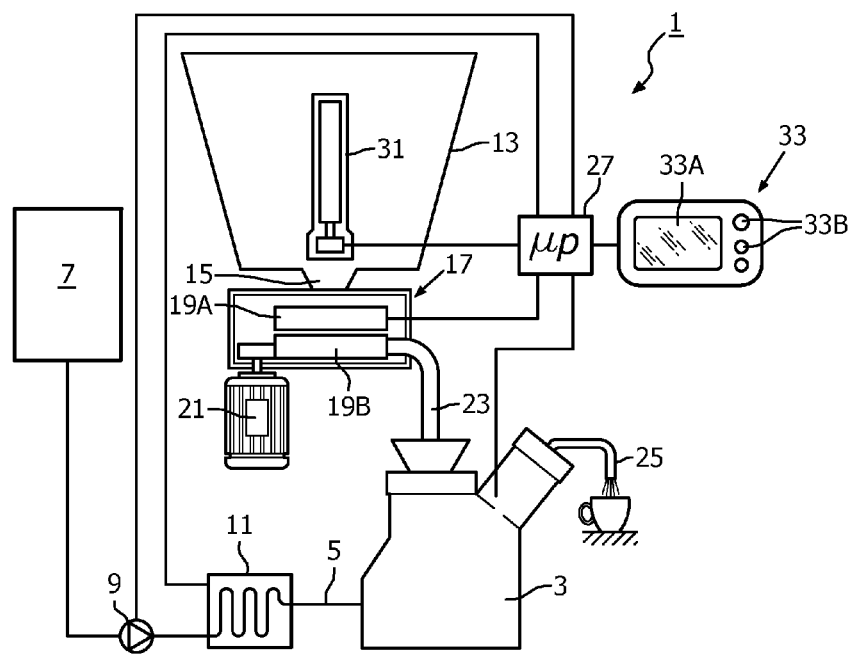
FIG. 1
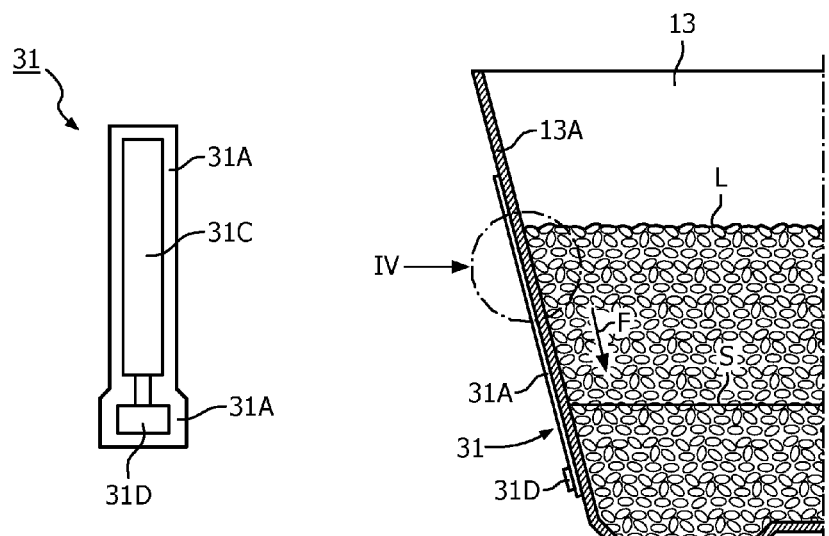
FIG. 2
FIG. 3

AUTOMATIC COFFEE MAKER WITH SENSOR FOR DETECTING THE QUANTITY OF COFFEE IN THE MACHINE

FIELD OF THE INVENTION

The present invention relates to the field of the coffee machines, both for domestic use and professional use and in particular the field of the automatic or semi-automatic coffee machines.

BACKGROUND OF THE INVENTION

For producing coffee-based drinks semi-automatic or automatic machines are used with a high number of functions and controls. A high level of automation is applied also to the machines for domestic use and not only professional use.

Typically a coffee machine has a brewing unit, a water reservoir, a boiler for the production of hot water to supply to the brewing unit, a coffee container, an electronic control unit and a user interface. By means of the interface, the user can set a series of functions, parameters for producing the drink and other, depending upon the machine model and the performances thereof. In some cases the machine produces exclusively coffee, whereas in others it can produce even other drinks, for example hot water, cappuccino, hot milk or the like. All these functions can be selected, if present, by means of the user interface. This is used also to signal the user possible failures of the machine, alarm conditions or other events which can prevent the machine from operating correctly. In many machines of this type a reservoir of coffee beans and a grinder to grind the coffee beans and to produce a coffee powder which is supplied to the brewing unit. In other machines the reservoir receives directly the coffee powder and this is supplied in doses predetermined and set by the user to the brewing unit.

One of the problem arising in the modern coffee machines is the need of signalling the user the lack of coffee, in particular the lack of coffee beans in a reservoir upstream the grinder.

When the coffee beans contained in the container is not sufficient for preparing a coffee dose, that is to fill up adequately the brewing chamber of the brewing unit, the machine stops by providing an alarm signal to the user, which has to see to fill up again the coffee container.

In some known machines, in order to control the quantity of ground coffee a volumetric system for measuring the powder produced by the grinder is provided. If the quantity of coffee powder required for one dose of drink is not reached in a pre-set grinding time, this is interpreted by the central unit of the machine as absence of coffee beans in the container. The machine stops and the user has to fill up the container with new coffee beans, starting again the machine. As the central unit knows the volume of ground coffee, in this case it is possible performing a second grinding operation to reach the volume of ground coffee necessary to obtain the cup of coffee.

This system has two drawbacks. First of all it is necessary to adopt a system for measuring the quantity of ground coffee, which increases considerably the costs and the size of the machine. Secondly, the volumetric measurer is subjected to failures and thus it represents a critical element in the operation of the machine. Furthermore, when the coffee beans exhaust during the grinding phase, the machine stops and the user has to fill up again the container, when, on the contrary, one would expect to be able to obtain quickly a cup of drink. This makes not very comfortable the use of the machine. In order to avoid the stop of the machine during the grinding and brewing cycle, the user should control the level of the coffee beans in the container each time before starting the machine.

In more modern machines the coffee volumetric measuring has been eliminated and a measured is performed, based upon the revolutions which the grinder has to make to produce the wished quantity of ground coffee, assuming that between the revolutions and the quantity of ground coffee there is a biunivocal relation, a sufficiently precise assumption for the requested goals. However, in this way when the container of coffee beans empties during the grinding of a coffee charge before the grinder has performed the revolutions corresponding to the coffee dose to be ground, the grinder continues to rotate without coffee therefore without producing powder and the machine is stopped after a certain period of time. In other cases, the stop is performed as a function of a signal indicative of the fact that the grinder is running unloaded. In each case, when the grinder has stopped, the central unit cannot recognize the already ground quantity of coffee and therefore it cannot know how much coffee should still be ground after the user has filled up again the container with beans.

Therefore, when the container of coffee beans is filled up again and the machine is started again, the control unit makes it necessary to unload completely the coffee powder produced in the cycle of partial grinding, which has remained incomplete in the phase preceding the stop, and the whole cycle has to be started again. This involves the clear drawback of wasting a partial coffee dose for each interruption due to the exhaustion of the beans in the container.

In order to detect the absence of beans in the container systems of various type have been studied, for example based upon the measuring of an electric parameter of the engine driving the grinder (WO-A-2008/001403), that is a system based upon measuring the vibrations (US-A-2006/0222736).

Systems of optical type have been studied too, measuring the presence of an adequate quantity of coffee beans in the container. These measuring devices have at least an optical barrier with a sender and a transmitter arranged so that the optical beam intersects the volume of the bean container. When the quantity of beans goes below the level of the optical barrier, the optical detector sends an alarm signal communicating to the user the need to restore the level of beans in the container before this is wholly empty.

These optical systems have considerable drawbacks due to the fact that the environment wherein they have to work involves the deposit of coffee powders or debris preventing the used photocells or optical sensors from operating correctly. Furthermore, the system is particularly expensive as it requires two components to be applied onto the container (a sender and a receiver). Furthermore, it is necessary arranging the sensors inside the walls of the container or manufacturing the walls of the container with transparent material which, however, is likely to get dirty or wear out until preventing the sensors from operating correctly. Furthermore, as it is known, the coffee beans can have difficulties in sliding inside the container and form bridges or blocks of beans which remain temporarily still. If this happens under a condition of poor quantity of coffee contained in the container and locking the beam along the path from the sender to the receiver, the device does not operate and it does not send the signal of lack of coffee, even when the quantity of coffee in the container is insufficient for preparing one dose of drink.

WO-A-2007/000195 describes an automatic coffee machine comprising a reservoir of water and a reservoir of coffee beans. The coffee beans are supplied to an underlying coffee grinder which produces the coffee powder with which the drink is produced. Predetermined doses of coffee powder are loaded into the brewing chamber for each brewing cycle. A capacitive sensor is associated to the reservoir of coffee beans, which sensor should be useful to signal to the user the presence of coffee beans and consequently the lack of beans, but it is not able to provide information useful for handling more correctly the content of the reservoir of coffee beans.

SUMMARY OF THE INVENTION

According to an aspect, the invention proposes to implement a coffee machine of the type mentioned above, which overcomes wholly or partially one or more drawbacks of the known machines.

According to an embodiment, the machine according to the invention provides the use of a different type of detector or sensor for signalling, through the user interface, the need for restoring the quantity of coffee in the container.

In a practical embodiment the sensor is a sensor of capacitive type which allows sending a signal as a function of the quantity of coffee in the container. Preferably, the sensor and the control unit of the machine are implemented, arranged and programmed to supply to the user information about the shortage of coffee in the container, to warn the user so that he/she takes action to restore an adequate level of coffee in the container. This piece of information is supplied advantageously when in the container there is still a quantity of coffee sufficient for preparing at least a predetermined quantity of drink, for example to supply one cup or two cups or even more cups of coffee. Contrary to other known machines using capacitive sensors, in this way the sensor does not limit to warn the user that the container is empty, a circumstance that he/she can verify in any other suitable way and therefore it is not necessary adopting a proper sensor. On the contrary, the capacitive sensor is implemented and used in an innovative way: it allows the user to know that it is necessary to restore the right level of coffee (in beans or in powder) in the container, but such piece of information is supplied before exhausting the coffee in the container, so that the user can however perform at least one supply cycle. In this way the drawbacks described above of the most modern machines are avoided. In particular it is avoided that the user notices the lack of coffee in the container only when the container is wholly empty and in case one coffee supply cycle fails due to the lack of product.

Hereinafter a coffee machine will be normally referred to wherein the coffee is inserted in beans and ground by a grinder, as this type of machines is more widespread than others wherein directly the ground powder is inserted, and as in these machines the need is more felt for detecting in a well-timed and reliable way the exhaustion of the coffee beans in order to intervene in the right moment and to provide for restoring the required quantity of coffee in the container. However, it must be understood that at least some of the invention advantages can be exploited even when the machine requests to be loaded with powder of ground coffee.

In substance, at least a capacitive sensor can be associated to the container of coffee beans in a position so that this sensor can supply at least a signal of presence/absence of coffee in that position which corresponds to a threshold, therebelow there still is an adequate quantity of coffee to produce for example one, two or even more cups of coffee, but once reached this threshold it is necessary to signal to the user the possibility or need to fill up again the container with beans to avoid that in one of the subsequent cycles the machine stops.

The interface can supply information about the quantity of coffee beans in the container in function of the sensor signal. This signal can be of optical type, for example a message on a display or a light signalling through one or more light-emitting diodes (LED) can be provided. The possibility of supplying a signal of acoustic type is not excluded, for example with sounding device or even with a speech synthesizer which communicates to the user the need for loading the coffee container.

In some embodiments, the sensor can provide at least an electrically conductive strip placed onto the outer surface of the container, which develops for an adequate length in a direction corresponding to the direction along thereof the level of coffee beans inside the container lowers. In this way it is possible obtaining an analog or digital signal which provides not only an alarm when the coffee goes below a minimum threshold or minimum level beyond thereof it is necessary to restore the quantity of coffee in the container, but even an indication about the really present level of coffee. Practically, in this way it is possible indicating the user through the interface the quantity of residual coffee, so that the user has more detailed information about the real level of coffee in the container. He/she can then realize the quantity of coffee even when this is abundantly above the level beyond thereof the machine has to be filled up again. This can be particularly useful, for example, to allow the user to programme the purchase of a new coffee pack.

Analogous results can be obtained by using a plurality of sensors arranged in sequence, each one thereof has a strip with smaller sizes, for a local or punctual detection of the coffee level by means of local measuring of the strip capacity. Each one of these sensors, then, will generally supply a signal of presence/absence of coffee. The combination of several signals provides discretized information about the real level of coffee in the container and not only an alarm signal when this level goes below a limit value.

Generally, the measuring and therefore the signal generated by the sensor is based upon the fact that the capacity of the strip(s) or other measuring elements varies depending upon the presence or absence of coffee immediately near the measuring element. Therefore, by using measuring elements with proper shape and/or in variable number and position it is possible supplying to the user several types of information.

In some embodiments it can be provided that a graph or a bar diagram is represented onto the interface, wherein each bar corresponds to one of the sensors arranged in sequence. The turning on/off of each light bar on the display or other interface allows the user to have an immediate and intuitive idea of the quantity of coffee existing in the container. Instead of a bar diagram on a display it is possible using a series of LED or other light indicators.

According to some embodiments, the sensor or the sensors can be of differential type, that is they can have two strips or other more or less extended measuring elements, manufactured with electrically conductive material, for example copper or the like, and arranged so as to generate two signals, the difference thereof allows obtaining a rejection of the common mode signals, caused by spurious factors. This is particularly useful to avoid, for example, that the signal is influenced by a humidity variation, or by a thermal shift or by the aging of the sensor circuit components or by other factors.

BRIEF DESCRIPTION OF THE DRAWINGS

The invention will be better understood by following the description and the enclosed drawing, which shows a not limitative practical embodiment of the invention. More in particular, in the drawing:

FIG. 1 shows a schematic representation of the main components of an automatic coffee machine thereto a capacitive sensor is applied, for the detection of the quantity of coffee beans;

FIG. 2 shows a schematic representation of a sensor with an extended strip to provide an analog signal representative of the level of coffee beans in the container;

FIG. 3 shows a partial local section of a container thereto the sensor of FIG. 2 is applied;

DETAILED DESCRIPTION OF EMBODIMENTS OF THE INVENTION

Figure 4:
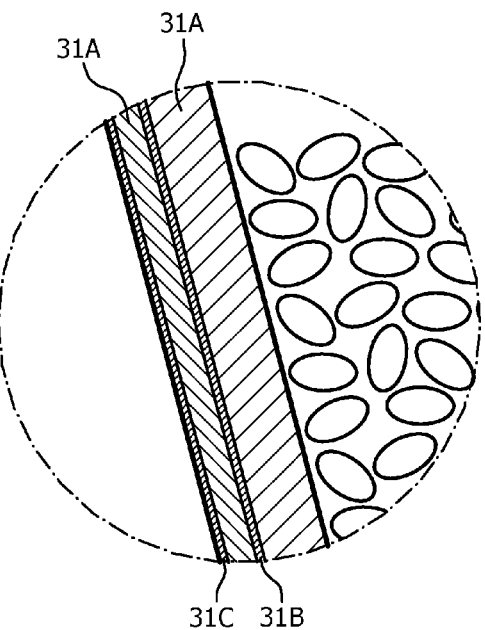
FIG. 4 shows an enlargement of the detail designated with IV in FIG. 3.

In FIG. 1 the main components of an automatic coffee machine, thereto the present invention can be applied, are represented under the form of functional blocks. The representation of the several blocks is schematic, as they are known to the person skilled in the art. The representation of FIG. 1 is to be meant exclusively as an example, as the invention can be implemented in machines of various type, even for example without the grinder unit, as indicated above.

By referring to FIG. 1, the machine, designated as a whole with 1, includes a brewing unit 3, thereto, by means of a line 5, hot water under pressure is supplied. The water is picked up from a reservoir 7 through a pump 9 which makes the water picked up from the reservoir 7 to flow through a boiler 11. This is represented as boiler with instantaneous heating, that is wherein the cold water pumped from the pump 9 is heated during the boiler crossing. Therefore the boiler 11 can also be of other type, for example an accumulation boiler.

In other not shown embodiments more than one boiler and/or more than one brewing unit can be provided, for example for preparing coffee of different types, or even for the preparation of drinks different from the coffee. In some embodiments reservoirs of lyophilized or concentrated substances can be provided to supply to one or more mixers associated or combined to a brewing unit 3 for the production of coffee, the whole as known to the persons skilled in the art.

In the diagram of FIG. 1, a coffee container is designated with 13 which, in this embodiment example, is apt to receive coffee beans. The reservoir 13 has a lower output 15 therethrough the coffee beans are supplied to a grinder 17. The grinder can include, in a way known on itself, two grinding machines here schematically designated with 19A and 19B, at least one thereof can be controlled in the rotation for example by means of an engine 21.

The coffee beans which are supplied from the reservoir 13 to the grinder 17 is ground and the coffee powder is supplied through a duct 23 towards the (not shown) brewing chamber contained in the brewing unit 3. The latter can be a brewing unit of any type and here schematically represented with a generic block, which has an outlet 25 therethrough the coffee-based drink is supplied, obtained by making the brewing chamber, wherein the ground coffee has been compressed, to be crossed by the hot water under pressure supplied through the line 5. The water pressure can be controlled and modified according to the type of drink which the user can obtain.

Apart from the brewing pressure, in some embodiments other parameters can be set, such as for example the quantity of ground coffee for each dose, the water temperature, the larger or smaller fineness of the coffee powder and son on.

The various functions can be controlled through a properly programmable electronic control central unit, schematically designated with 27. The control unit 27 can comprise a microprocessor or other programmable logic.

As schematically shown in FIG. 1, in some embodiments the control central unit 27 is connected to the brewing unit 3, to the boiler 11, to the pump 9, to the grinder 17 and to the engine thereof, in case to the water reservoir 7 an to a capacitive sensor 31 associated to the container 13 of coffee. The central unit 27 communicates towards outside through an interface schematically and generally designated with 33. This can have a display 33A and one or more elements, components or devices, schematically designated with 33B such as for example LED, knobs, switches or other elements therewith the user can set functions or controls, that is therewith information about the machine operating conditions or other can be provided.

The nature and the configuration of the interface 33 can be anyone and it is not particularly important. The important thing is that the central unit 27 through the interface 33 or other suitable component or communication element can provide the user at least a signal indicative of the quantity of coffee inside the container 13. This communication element can be inserted into the interface 33 or it could be also constituted by an additional interface separated by the main interface of the machine, wherein under interface any device, system, component or element is meant, which can provide intelligible information to the user under the form of light, acoustic, speech signal or other.

In the easiest embodiment of the machine the capacitive sensor 3 can be constituted by a punctual or local sensor, that is comprising a single strip or other electrically conductive measuring element, even if with small surface size, positioned at a height of the container 13 corresponding to the level below thereof it is considered to be necessary to fill up again the coffee container 13 to avoid that the machine and in particular the grinder 17 runs unloaded. The level thereat such type of simplified sensor can be positioned will be so that the volume of coffee beans below the level signalled by this sensor is still so as to allow preparing, for example, at least a small cup of coffee. In this way, the user can obtain a useful signal based thereupon he/she realizes the need to fill up again the container 13 with coffee, as the remained quantity of coffee is insufficient. Moreover, this signal is supplied when the machine is still able to complete the on-going brewing cycle, and in case one or more subsequent cycles thus by avoiding the drawbacks described above.

In more advanced embodiments, the capacitive sensor(s) associated to the container 13 allow supplying a more processed signal which, apart from indicating the need for filling up again the container 13 when the coffee goes below a minimum level, can also provide an indication about the real quantity of coffee contained in the container itself. FIGS. 2, 3 and 4 show a possible shape of an analog sensor able to provide a piece of information of this type. In FIG. 3 the reservoir 13 is shown partially sectioned with a wall 13A outside thereof a sensor, wholly designated with 31, is applied. The wall 13A of the container 13 in this case is made of an electrically non-conductive material to allow the capacitive detection of the quantity of coffee inside thereof by arranging the sensor outside. The application of the sensor 31 outside the container is preferred, although the possibility of inserting the sensor inside the container itself is not excluded. Moreover, the last solution makes the sensor subjected to get dirty or to damage due to the continuous passage of coffee beans on the surface thereof. In other embodiments the sensor can be incorporated in the material forming the wall of the container 13.

The sensor 31 has a supporting laminar element 31A for example made of vetronite, or other insulating material, onto the two opposed faces thereof two electrically conductive strips 31B and 31C are applied. These can be implemented by means of a usual technique for producing the printed circuits. As it can be seen in FIG. 2, each strip (in FIG. 2 being shown only strip 31C, but the opposed strip having substantially equal development) has an elongated shape in a direction corresponding to the direction F (FIG. 3), along thereof the mass of coffee beans moves gradually as they are supplied to the underlying grinder 17. In substance, then, each strip 31B, 31C has a longitudinal development in the direction of lowering of the level of beans inside the container 13. In this way the electric capacity of each strip and in particular of the strip 31B faced towards the wall 13A of the container 13 varies gradually as the level L (FIG. 3) of the coffee beans in the container 13 lowers, circumstance which allows by means of the sensor 31 to generate an analog signal function of the height thereat the level L of coffee is and therefore of the quantity really present in the container 13.

A circuit 31D is mounted upon the strip 31A, electrically connected to the conductive strips 31B and 31C. The circuit 31D is of the kind known on itself and it constitutes, together with the strips 31B and 31C (forming the sensible elements) the real capacitive sensor.

The mass of coffee beans has a greater effect upon the capacity of the strip 31B faced towards the wall 13A and a smaller or negligible effect upon the capacity of the strip 31A faced towards the opposite site. This allows obtaining a differential signal therefrom the common mode disturbances, that is the variations in the capacity of the strips which do not depend upon the level of coffee inside the container 13, for example variations due to the presence of humidity or to the proximity of bodies which can alter the capacity of the two strips.

The circuit 31D is connected to the control unit 27 which, based upon the differential signal obtained by the circuit 31D, properly digitalized, supplies the user an indication about the real level of coffee in the reservoir 13 and in case an alarm when this level goes below a threshold, for example the one represented with a dash-dot line S in FIG. 3.

Figure 5:
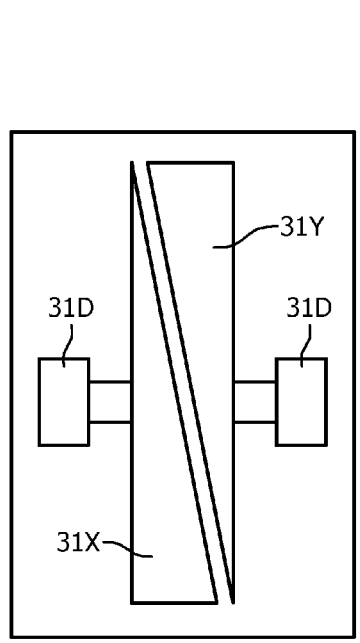
FIGS. 5 and 6 show schematic representations of other embodiments of the sensor.

FIG. 5 shows schematically a sensor analog to that of FIG. 4, wherein however two pairs of strips equal therebetween are provided, only two thereof are visible in figure. Each pair of strips, designated with 31X and 31Y, is connected to the detection circuit 31D and it has an elongated triangular shape. The two triangles are arranged in inverted positions to cover a substantially rectangular surface. In this way the effect of the coffee level upon the capacity of the two pairs of strips varies in different way for one pair and for the other one, so that the sensor can supply a stronger signal.

Figure 6:
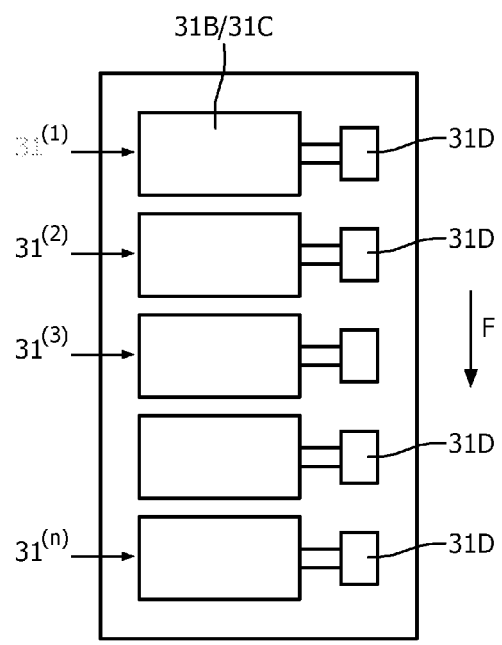

In FIG. 5 an additional embodiment is shown, wherein instead of a single sensor 31 N sensors designated with 31(1), 31(2), 31(3), . . . 31(n) are used. Each one of the sensors comprises a pair of strips 31B/31C and a circuit 31D electrically connected to the two strips. These can have, as shown in FIG. 6, a much smaller development than that of the strips 31B and 31C of FIG. 2. These sensors are arranged in sequence along the direction F of lowering of the level of coffee in the container 13, so that each one can supply a signal of presence/absence of coffee and the combination of these signals supplies an indication of the real level of coffee in the container. In substance, it is a digital solution to obtain information similar to the one obtained in analog way with the arrangement of FIG. 5, that is of FIGS. 2, 3 and 4. The sensors of FIG. 6 and the sensors of FIG. 5 can be applied on the container 13 in a configuration analogous to the one represented in FIG. 3.

It is to be meant that the drawing shows only an exemplification given as practical demonstration of the invention, which can vary in the embodiments and arrangements still remaining within the concept upon which the invention is based. The possible presence of reference numbers in the enclosed claims aims at facilitating the reading of the claims by referring to the description and to the drawing and it does not limit the scope of the protection represented by the claims.

The invention claimed is:

1. An automatic coffee maker, comprising:
a brewing unit;
a water supply to a boiler for the production of hot water to supply to said brewing unit;
a coffee container;
an electronic control unit;
a user interface; and
wherein at least one capacitive sensor is associated to said coffee container at a position such that the sensor supplies a signal indicating one of a presence or absence of coffee in said position which corresponds to a threshold at which there remains a quantity of coffee beans or powder in said container sufficient to prepare at least one cup of brewed coffee, said sensor connected to said electronic control unit to supply said signal;
wherein said signal is supplied when the coffee maker is still able to complete an on-going brewing cycle, and
wherein said electronic control unit is programmed to supply to a user through said interface information regarding the quantity of coffee in said container
wherein said at least one capacitive sensor comprises at least one electrically conductive strip interfaced with said container to supply a signal at least when the quantity of coffee in said container is below a threshold value.

2. The automated coffee maker according to claim 1, wherein said container is a container for coffee beans, and in that a grinder is provided to grind said coffee beans and to produce ground coffee for said brewing unit, said at least one capacitive sensor being implemented and arranged to provide at least a piece of information regarding the quantity of coffee beans in said container.

3. The automated coffee maker according to claim 1, wherein said electronic control unit is programmed to supply a signal through said user interface at least when the quantity of coffee in said container is below said threshold value.

4. The automated coffee maker according to claim 1, wherein said capacitive sensor is arranged and implemented to supply a signal variable as a function of the quantity of coffee in said container, the electronic control unit being programmed to supply through said user interface and as a function of said signal, a piece of information variable in a continuous or discrete way and indicative of the variable quantity of coffee in said container.

5. The automated coffee maker according to claim 1, wherein said at least one capacitive sensor comprises a plurality of electrically conductive strips arranged in sequence along a direction of lowering of the level of coffee in said container.

6. The automated coffee maker according to claim 1, wherein said at least one capacitive sensor comprises at least an electrically conductive strip extending along a direction of lowering of the level of coffee in said container.

7. The automated coffee maker according to claim 1, wherein said at least one capacitive sensor comprises a circuit to eliminate or reduce signal disturbances caused by spurious factors.

8. The automated coffee maker according to claim 1, wherein said at least one capacitive sensor comprises at least two measuring elements and one circuit to subtract a first signal and a second signal respectively supplied by each of said two measuring elements to eliminate common mode disturbances, the two measuring elements being arranged at different distances from the inner volume of the container, so that the signal obtained by subtracting the first signal and said second signal of each of said two measuring elements is a function of the quantity of coffee in the container.

9. The automated coffee maker according to claim 1, wherein said at least one sensor is positioned outside the wall of the container, said wall being made at least partially of electrically non-conductive material.

10. The automated coffee maker according to claim 1, wherein said at least one sensor comprises two plates or strips forming measuring elements connected to a measuring circuit and mutually spaced apart by an electrically non-conductive element, the sensor being mounted with the two measuring elements at different distances with respect to the wall of the container.

* * * * *